United States Patent
Graham, Jr.

(10) Patent No.: US 6,379,730 B1
(45) Date of Patent: Apr. 30, 2002

(54) METHOD FOR THE PREVENTION OF STRUVITE IN FISH

(75) Inventor: Elwood E. Graham, Jr., Castro Valley, CA (US)

(73) Assignee: Cargill Incorporated, Wayzata, MN (US)

( * ) Notice: Subject to any disclaimer, the term of this patent is extended or adjusted under 35 U.S.C. 154(b) by 0 days.

(21) Appl. No.: 09/532,450

(22) Filed: Mar. 23, 2000

Related U.S. Application Data

(60) Provisional application No. 60/126,025, filed on Mar. 25, 1999.

(51) Int. Cl.$^7$ .................. A23L 1/325; A23L 3/3526
(52) U.S. Cl. .................. 426/324; 426/325; 426/332; 426/643; 426/129
(58) Field of Search .................. 426/324, 325, 426/326, 332, 129, 643

(56) References Cited

U.S. PATENT DOCUMENTS

| | | | | |
|---|---|---|---|---|
| 1,686,393 A | * | 10/1928 | Oshima | 426/325 |
| 2,064,872 A | * | 12/1936 | Ash et al. | 426/325 |
| 2,448,970 A | * | 9/1948 | Ganucheau | 426/325 |
| 2,554,625 A | * | 5/1951 | McFee et al. | 426/324 |
| 2,555,236 A | * | 5/1951 | Kreidl et al. | 426/324 |
| 2,680,076 A | * | 6/1954 | Swaine | 426/324 |
| 2,870,025 A | * | 1/1959 | Fellers et al. | 426/324 |
| 2,937,096 A | * | 5/1960 | Geiger et al. | 426/324 |
| 4,539,212 A | * | 9/1985 | Hunter | 426/326 |
| 4,741,911 A | * | 5/1988 | McIntyre et al. | 426/324 |
| 4,971,821 A | * | 11/1990 | McIntyre | 426/324 |
| 5,332,587 A | * | 7/1994 | Howard et al. | 426/324 |
| 5,578,240 A | | 11/1996 | Park et al. | 510/513 |
| 5,989,847 A | | 11/1999 | Park et al. | 45/28 |

FOREIGN PATENT DOCUMENTS

| | | | | |
|---|---|---|---|---|
| CA | 1131982 | * | 9/1982 | 426/325 |
| JP | 46-34375 | | 10/1971 | |
| JP | 46-36180 | | 10/1971 | |
| WO | WO92/08361 | * | 5/1992 | 426/325 |

OTHER PUBLICATIONS

Use of Citric Acid in the Seafood Industry, Haarman & Reimer Corp. (Existed as of Sep. 1997).
21 CFR 172.120 as of 1996.
Handbook of Food Additives, 2d Ed 1972.
Lopez, A., A Complete Course inCanning, 10$^{th}$ Edition. A publication of the Canning Trade, Baltimore, MD, 1975, pp. 340–342–549.

* cited by examiner

*Primary Examiner*—Steven Weinstein
(74) *Attorney, Agent, or Firm*—Fitch, Even, Tabin & Flannery

(57) ABSTRACT

The invention is directed to a method and composition for the prevention of struvite in containers such as cans. The method includes combining a water soluble vitamin selected from the group consisting of pantothenic acid, the calcium salt of pantothenic acid, vitamin B12, folic acid, niacin and mixtures thereof with the fish. The composition is a tablet comprising the water soluble vitamin and sodium chloride.

20 Claims, No Drawings

METHOD FOR THE PREVENTION OF STRUVITE IN FISH

This application is a non-provisional application claiming priority under 35 U.S.C. 119(c) to U.S. provisional application No. 60/126,025, filed Mar. 25, 1999.

FIELD OF THE INVENTION

This invention is directed to a method and composition for the prevention of struvite in canned fish. More particularly, the invention is directed to the prevention of struvite by adding a water soluble vitamin selected from the group consisting of pantothenic acid, the calcium salt of pantothenic acid, vitamin B12, folic acid, niacin and mixtures thereof into the canned fish. The invention is particularly effective in preventing struvite in canned salmon. The composition of the invention includes a tableted water soluble vitamin and sodium chloride.

BACKGROUND OF THE INVENTION

Small crystals resembling small pieces of broken glass frequently are found in canned fish, such as salmon. These crystals are transparent and tasteless particles of struvite which is magnesium ammonium phosphate. Struvite generally is regarded as harmless, but commercially is highly undesirable because struvite crystals may be confused with glass particles and result in product rejection by the consumer.

It generally is thought that struvite is formed as a result of magnesium which exists from water used in and resulting from the processing of the fish. This water includes magnesium and phosphates. While it is known that the formation struvite can be minimized or prevented by the addition of acids such as citric acid, hydrochloric acid or acetic acid, or the addition of ascorbic acid in combination with citric acid, the addition of such acids can cause deleterious off flavors, and may require labeling problems in that the acids will be seen as an "unnatural" additive to the food.

SUMMARY OF THE INVENTION

This invention is directed to a method and composition for the prevention of struvite in fish in containers, such as cans. In an important aspect, the invention is directed to a method and composition which prevents struvite in canned salmon. The method of the invention includes combining or dispersing a water soluble vitamin selected from the group consisting of pantothenic acid, the calcium salt of pantothenic acid, vitamin B12, folic acid, niacin (nicotinic acid) and mixtures thereof into the canned fish. The addition of the water soluble vitamin is beneficial to the consumer, is a natural ingredient that is recognized as beneficial to the consumer and does not adversely affect the flavor of the fish. The water soluble vitamin is combined with the fish in an amount effective for the prevention of the struvite in the canned fish. In general from about 0.001 to about 1.0 grams of water soluble vitamin per pound of canned fish are added into a can which contains the fish, and in an important aspect about 0.005 to about 0.007 grams of water soluble vitamin per pound of fish are added into the can. In another important aspect, in addition to the water soluble vitamin, sodium chloride also is combined with the canned fish in an amount of from about 25 grains to about 100 grains of sodium chloride per pound of canned fish (15.432 grains in a gram). In a very important aspect, the method of the invention is practiced by adding the vitamin and salt into the container of fish as a tablet. While not intending to be bound by any theory, the tablet slowly dissolves in the container of fish not only releasing salt, but the struvite preventing water soluble vitamin. As a result, the salt and vitamin are released into the fish in the container over time, and, hence, enhances the ability of these ingredients to inhibit or prevent struvite for periods of at least one year.

The composition of the invention is directed to a tablet comprising sodium chloride and the water soluble vitamin selected from the group consisting of pantothenic acid, the calcium salt of pantothenic acid, vitamin B12, folic acid, niacin and mixtures thereof. The water soluble vitamin in the tablet is in an amount effective for the prevention of struvite in a container of fish. In an important aspect, the tablet comprises from about 61.5 to about 99.98 weight percent sodium chloride and from about 0.02 to about 38.5 weight percent water soluble vitamin, based on the total weight of sodium chloride and water soluble vitamin in the tablet. In another important aspect, the tablet contains from about 1.6 to about 6.5 grams of sodium chloride and from about 0.005 to about 0.007 grams of water soluble vitamin per pound of canned fish. This type of tablet is especially useful in preventing struvite over time in one pound cans of salmon as described above.

DESCRIPTION OF THE PREFERRED EMBODIMENTS

The method of the invention includes combining with the fish a water soluble vitamin selected from the group consisting of pantothenic acid, the calcium salt of pantothenic acid, vitamin B12, folic acid, niacin and mixtures thereof during the canning process. Generally during the canning process the fish are gutted, deheaded and external parts such as fins are removed. Thereafter, fish such as salmon are deskinned and filleted. The fillets are placed into a can. The water soluble vitamin is added into the can along with sodium chloride and optional flavoring and preservative ingredients. Salmon fillets are approximately 70 weight percent water and about 30 weight percent solids. Some of this water is released into the can, dissolves the sodium chloride and vitamin and disperses the salt and vitamin into the fish. In practicing the method from about 0.001 to about 1.0 grams of water soluble vitamin per pound of fish are added into the fish in the can. In a very important aspect of the invention, from about 0.005 to about 0.007 grams of water soluble vitamin per pound of fish are added into the fish in the can. In the case of one pound cans of salmon, a particularly effective way to practice the method of the invention is adding combination of about 0.068 grams of water soluble vitamin and about 3.17 grams sodium chloride into a can which contains one pound of salmon. A 50 grain (about 3.24 grams) tablet containing about 1 to about 1.4 weight percent water soluble vitamin with the remaining portion of the tablet being sodium chloride is particularly effective in preventing struvite in a can containing about one pound of salmon.

In canning fish sodium chloride frequently is added to a fish such as salmon as a 50 grain tablet. Adding the water soluble vitamin and sodium chloride as a tablet to the can of fish is particularly effective composition to prevent struvite is made by mixing the water soluble vitamin with the sodium chloride to provide a mixture which comprises from about 1 to about 1.4 percent vitamin and from about 99 to about 98.6 weight percent sodium chloride. The mixture is tableted to form a tablet which then is added to a can of fish during the canning operation. Such a tableted mixture is particularly effective in preventing struvite. While not intending to be bound by any theory, it is believed that the pressed composition slowly releases the vitamin and salt in water and oils released by the fish which creates an aqueous environment for the fish in the container. This release of salt and vitamin is particularly effective for the prevention of struvite over a shelf life the canned fish such as salmon of at least one year.

To make the tableted composition of the invention, sodium chloride and the water soluble vitamin are mixed in amounts which are effective for preventing struvite. As noted above a mixture comprising from about 1 to about 1.4 weight percent water soluble vitamin is particularly effective. The sodium chloride and vitamin may be mixed in a large ribbon blender and then the resulting blend is tableted. To form the tablets, the blend of sodium chloride and vitamin are compressed in a single or rotary multiple tablet punch, as is known, and are compressed into tablets at a pressure of from about 10 to about 50 psi, preferably about 20–30 at a temperature of about 20° to about 25° C. for about 2 seconds. The resulting sodium chloride/vitamin tablet is ideal for struvite prevention in canned salmon.

The following examples illustrate how to practice invention.

EXAMPLES

The following procedures were used to evaluate the effect of various additives in struvite formation in salmon. Additive types and amounts are shown in the Table below.

(14.75 oz. of Salmon (Red) per 1 lb. steel (301) can w/coating)

| Lot # | Test # | Description | Salt Level | Additive Level |
|---|---|---|---|---|
| 1 | 1A | NaCl & Ascorbic Acid | 50 grains | .0055 gr. |
| 2 | 1B | NaCl & Ascorbic Acid | 50 grains | .0276 gr. |
| 3 | 1C | NaCl & Ascorbic Acid | 50 grains | .3946 gr. |
| 4 | 2A | NaCl & Ca Pantothenate | 50 grains | .0055 gr. |
| 5 | 2B | NaCl & Ca Pantothenate | 50 grains | .0276 gr. |
| 6 | 2C | NaCl & Ca Pantothenate | 50 grains | .3946 gr. |
| 7 | 3A | NaCl & Nicotinic Acid | 50 grains | .0055 gr. |
| 8 | 3B | NaCl & Nicotinic Acid | 50 grains | .0276 gr. |
| 9 | 3C | NaCl & Nicotinic Acid | 50 grains | .3946 gr. |
| 10 | 4A | NaCl & Ca Pantothenate & $MgCl_2$ | 50 grains | .0055 g Ca-P* .0082 g $MgCl_2$ |
| 11 | 4B | NaCl & Ca Pantothenate & $MgCl_2$ | 50 grains | .0276 g Ca-P .0082 g $MgCl_2$ |
| 12 | 4C | NaCl & Ca Pantothenate & $MgCl_2$ | 50 grains | .3946 g Ca-P .0082 g $MgCl_2$ |
| 13 | 5A | Ascorbic Acid | | .0055 g |
| 14 | 5B | Ascorbic Acid | | .0138 g |
| 15 | Control 1 | NaCl | 50 grains | |
| 16 | Control 1 | NaCl & Magnesium Chloride | 50 grains | .0082 g. |

*Calcium salt of pantothenic acid.

$MgCl_2$ was added to the samples indicated as it is known to result in struvite formation.

The above-described test samples were analyzed as follows.

Procedure/Method
1. Two liters of water were added to a metal basting pan.
2. A can of salmon was opened and the pH measured using a standard pH electrode.
3. The contents of the can were poured into the analysis hands and backbones found by splitting the fish meat into longitudinal sections. Either 0, 1 or 2 backbones are possible.
4. The contents were transferred to the basting pan and the meat was broken by hand into small fragments (<¼")
5. The liquor resulting was decanted and the washing repeated using 1 litre portions until the wash water was clear.
6. After the final decantation, any glass-like pieces were isolated with what remained of the bones and quantified in the manner described below.

Identification/Classification of Struvite

Struvite was identified as being present in a given test can by the discovery of shiny, opaque crystals varying in length between 0.01 mm and >1 cm. Once identified, the struvite crystals were quantified as to their size and the number present. The crystals were classified according to quantity by the scheme listed below.

The following conventions were used:

1. Classification of Quantities Found
    None found in can
    A few present (~3–10)
    Several present (>10–100)
    Many present (>100–1000)
    Too numerous to count (>1000) TNTC
2. Classification of Crystal Size
    Not detected (<0.1 mm)
    Small (0.1–1.0 m)
    Medium (>1.0 mm–1.0 cm)
    Large (>1.0 cm)

Results were as follows.

| | Lot #1 Data | | TNTC = Too Numerous To Count | |
|---|---|---|---|---|
| Can | pH | # Backbones | Struvite | Size/Quantity |
| 1 | 6.70 | 2 | No | |
| 2 | 6.95 | 1 | No | |
| 3 | 6.19 | 2 | No | |
| 4 | 6.25 | 1 | No | |
| 5 | 6.25 | 0 | Yes | Small-TNTC/a few medium & large |
| 6 | 6.19 | 2 | No | |
| 7 | 6.32 | 1 | No | |
| 8 | 6.34 | 1 | Yes | Small-several/large not detected/med-not detected |
| 9 | 6.34 | N/D | — | Small |

| | Lot #2 Data | | | |
|---|---|---|---|---|
| Can | pH | # Backbones | Struvite | Size/Quantity |
| 1 | 6.26 | 1 | No | |
| 2 | 6.32 | 1 | No | |
| 3 | 6.41 | 2 | No | |
| 4 | 6.22 | 0 | No | |
| 5 | 6.28 | 1 | Yes | |
| 6 | 6.37 | 0 | Yes | Large-a few/small & med.-not found |

Lot #3 Data

| Can | pH | # Backbones | Struvite | Size/Quantity |
|---|---|---|---|---|
| 1 | 6.22 | 2 | No | |
| 2 | 6.16 | 0 | No | |
| 3 | 6.14 | 1 | No | |
| 4 | 6.30 | 1 | No | |
| 5 | 6.29 | 1 | No | |
| 6 | 6.26 | 2 | No | |

Lot #4 Data

| Can | pH | # Backbones | Struvite | Size/Quantity |
|---|---|---|---|---|
| 1 | 6.34 | 1 | No | |
| 2 | 6.29 | 1 | No | |
| 3 | 6.50 | 0 | No | |
| 4 | 6.51 | 2 | No | |
| 5 | 6.38 | 0 | No | |
| 6 | 6.36 | 0 | No | |

Lot #5 Data

| Can | pH | # Backbones | Struvite | Size/Quantity |
|---|---|---|---|---|
| 1 | 6.40 | 1 | No | |
| 2 | 6.42 | 1 | Yes | Small-a few/med.-several/large-several |
| 3 | 6.44 | 1 | Yes | Small-several/med.-several/large-none found |
| 4 | 6.43 | 0 | No | |
| 5 | 6.44 | 1 | Yes | Small-a few/med.-a few/large-a few |
| 6 | 6.30 | 1 | No | |

Lot #6 Data

| Can | pH | # Backbones | Struvite | Size/Quantity |
|---|---|---|---|---|
| 1 | 6.45 | 1 | No | |
| 2 | 6.42 | 1 | No | |
| 3 | 6.37 | 1 | No | |
| 4 | 6.28 | 1 | No | |
| 5 | 6.32 | 1 | No | |
| 6 | 6.30 | 1 | No | |

Lot #7 Data

| Can | pH | # Backbones | Struvite | Size/Quantity |
|---|---|---|---|---|
| 1 | 6.41 | 1 | No | |
| 2 | 6.34 | 0 | Yes | Several small, a few medium, no large found |
| 3 | 6.33 | 0 | No | |
| 4 | 6.43 | 1 | No | |
| 5 | 6.34 | 1 | No | |
| 6 | 6.33 | 1 | No | |

Lot #8 Data

| Can | pH | # Backbones | Struvite | Size/Quantity |
|---|---|---|---|---|
| 1 | 6.41 | 1 | No | |
| 2 | 6.25 | 1 | No | |
| 3 | 6.34 | 1 | No | |
| 4 | 6.39 | 1 | No | |
| 5 | 6.40 | 0 | Yes | Small-several/med.-several-a few/one large present (extreme) |
| 6 | 6.29 | 0 | No | |

Lot #9 Data

| Can | pH | # Backbones | Struvite | Size/Quantity |
|---|---|---|---|---|
| 1 | 6.09 | 1 | No | |
| 2 | 6.35 | 1 | No | |
| 3 | 6.12 | 1 | No | |
| 4 | 6.45 | 1 | No | |
| 5 | 6.11 | 1 | No | |
| 6 | 6.19 | 1 | Yes | A few (>3 <10) two small crystals present |

Lot #10 Data

| Can | pH | # Backbones | Struvite | Size/Quantity |
|---|---|---|---|---|
| 1 | 6.38 | 0 | Yes | Small-TNTC/No med./no large |
| 2 | 6.61 | 1 | Yes | Small-TNTC/med.-several/large-one |
| 3 | 6.60 | 1 | Yes | Small-TNTC/No med./no large |
| 4 | 6.68 | 1 | Yes | Small-several/med.-a few/no large |
| 5 | 6.39 | 1 | Yes | Small-TNTC/med.-several/large-several |
| 6 | 6.27 | 1 | Yes | Small-one/med.-one |

Lot #11 Data

| Can | pH | # Backbones | Struvite | Size/Quantity |
|---|---|---|---|---|
| 1 | 6.38 | 2 | Yes | Small-TNTC/med./a few/large- none found |
| 2 | 6.31 | 1 | Yes | Small-TNTC/med.-TNTC/large-none found |
| 3 | 6.32 | 0 | Yes | Small-a few/med.-a few/large -none |
| 4 | 6.35 | 2 | No | |
| 5 | 6.22 | 1 | No | |
| 6 | 6.28 | 1 | No | |

Lot #12 Data

| Can | pH | # Backbones | Struvite | Size/Quantity |
|---|---|---|---|---|
| 1 | 6.29 | 1 | No | |
| 2 | 6.41 | 1 | Yes | Small-a few/med.-one/large-none found |

-continued

Lot #12 Data

| Can | pH | # Backbones | Struvite | Size/Quantity |
|---|---|---|---|---|
| 3 | 6.31 | 1 | No | |
| 4 | 6.27 | 0 | Yes | Small-a few/med. -a few/large-none found |
| 5 | 6.23 | 1 | No | |
| 6 | 6.23 | 0 | No | |

Lot #13 Data

| Can | pH | # Backbone | Struvite | Size/Quantity |
|---|---|---|---|---|
| 1 | 6.27 | 1 | No | |
| 2 | 6.40 | 1 | No | |
| 3 | 6.25 | 2 | No | |
| 4 | 6.30 | 1 | No | |
| 5 | 6.35 | 1 | No | |
| 6 | 6.39 | 1 | No | |

Lot #13 Data

| Can | pH | # Backbone | Struvite | Size/Quantity |
|---|---|---|---|---|
| 1 | 6.18 | 1 | No | |
| 2 | 6.24 | 1 | No | |
| 3 | 6.31 | 1 | No | |
| 4 | 6.31 | 2 | No | |
| 5 | 6.38 | 2 | Yes | Small-several/med.-two |
| 6 | 6.28 | 1 | No | |

Lot #15 Data

| Can | pH | # Backbones | Struvite | Size/Quantity |
|---|---|---|---|---|
| 1 | 6.38 | 2 | Yes | Small-several/med.-several |
| 2 | 6.24 | 1 | Yes | Small-several/med.-three/large-one |
| 3 | 6.24 | 2 | No | |
| 4 | 6.29 | 0 | Yes | Small-several/med.-one |
| 5 | 6.21 | 1 | Yes | Small-TNTC/med.-a few/large-one found |
| 6 | 6.23 | 1 | Yes | Small-TNTC/med.-one |

Lot #16 Data

| Can | pH | # Backbones | Struvite | Size/Quantity |
|---|---|---|---|---|
| 1 | 6.79 | 1 | Yes | Small-few/med.-few/large-not found |
| 2 | 6.46 | 1 | Yes | Small-TNTC/med.-few/large-none found |
| 3 | 6.19 | 1 | Yes | Small-TNTC/med.-a few |
| 4 | 6.38 | 0 | Yes | Small-TNTC/med.-a few |
| 5 | 6.34 | 2 | No | |
| 6 | 6.34 | 1 | Yes | Small-TNTC/med.-two/large one |

What is claimed is:

1. A method for the prevention of struvite in a can which includes fish, the method comprising:
combining in the can, the fish and a water soluble vitamin selected from the group consisting of pantothenic acid, the calcium salt of pantothenic acid, vitamin B12, folic acid, niacin and mixtures thereof, the water soluble vitamin being added to the can in an amount effective for the prevention of struvite in the canned fish.

2. The method for the prevention of struvite as recited in claim 1 wherein from about 0.001 to about 1 grams of water soluble vitamin per pound of fish are combined with the fish.

3. The method as recited in claims 1 or 2 wherein the method further includes combining with the fish from about 1.6 to about 6.5 grams of sodium chloride per pound of fish.

4. The method as recited in claim 3 wherein the water soluble vitamin is vitamin B12.

5. The method as recited in claim 4 wherein the fish is salmon.

6. The method as recited in claim 3 wherein the water soluble vitamin is pantothenic acid or the calcium salt of pantothenic acid.

7. The method as recited in claim 6 wherein the fish is salmon.

8. The method of claim 1 wherein the fish is salmon.

9. The method as recited in claim 1 wherein the water soluble vitamin is vitamin B12.

10. The method as recited in claim 1 wherein the water soluble vitamin is pantothenic acid or the calcium salt of pantothenic acid.

11. A method for the prevention of struvite in a can which includes fish, the method comprising:
combining in the can, the fish, a water soluble vitamin and sodium chloride, the water soluble vitamin selected from the group consisting of pantothenic acid, the calcium salt of pantothenic acid, vitamin B12, folic acid, niacin and mixtures thereof, the water soluble vitamin being added to the can in an amount effective for the prevention of struvite in the canned fish, and the salt being added to the can in an amount of from about 1.6 to about 6.5 grams of sodium chloride per pound of fish.

12. A method as recited in claim 11 wherein the water soluble vitamin and sodium chloride are together in a tablet and the tablet is added to the fish in the can.

13. A method as recited in claim 12 wherein the tablet comprises from about 61.5 to about 99.98 weight percent sodium chloride and from about 0.02 to about 38.5 weight percent water soluble vitamin, based on the weight of sodium chloride and water soluble vitamin.

14. The method as recited in claim 13 wherein the water soluble vitamin is vitamin B12.

15. The method as recited in claim 13 wherein the water soluble vitamin is pantothenic acid or the calcium salt of pantothenic acid .

16. The method as recited in claim 15 wherein the fish is salmon.

17. The method as recited in claims 13 or 14 wherein the fish is salmon.

18. The method as recited in claim 11 wherein the water soluble vitamin is vitamin B12.

19. The method as recited in claim 11 wherein the water soluble vitamin is pantothenic acid or the calcium salt of pantothenic acid.

20. A method for the prevention of struvite in a can which includes fish, the method comprising:

combining in the can, the fish, salt and a water soluble vitamin selected from the group consisting of pantothenic acid, the calcium salt of pantothenic acid, vitamin B12, folic acid, niacin and mixtures thereof, the water soluble vitamin being added to the can in an amount effective for the prevention of struvite in the canned fish, the vitamin being added to the can in an amount of from about 0.001 to about 1 grams of vitamin per pound of fish and the salt being added to the can in an amount of from about 1.6 to about 6.5 grams of salt per pound of fish.

* * * * *